US012001857B2

United States Patent
Pai et al.

(10) Patent No.: US 12,001,857 B2
(45) Date of Patent: *Jun. 4, 2024

(54) DEVICE LOCATOR DISABLE AUTHENTICATION

(71) Applicant: Apple Inc., Cupertino, CA (US)

(72) Inventors: Raghunandan K. Pai, Cupertino (CA); Karthik Narayanan, Santa Clara, CA (US); Paul Chinn, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/323,302

(22) Filed: May 24, 2023

(65) Prior Publication Data

US 2023/0297394 A1    Sep. 21, 2023

Related U.S. Application Data

(63) Continuation of application No. 16/565,202, filed on Sep. 9, 2019, now Pat. No. 11,704,134, which is a
(Continued)

(51) Int. Cl.
*G06F 9/445* (2018.01)
*G06F 21/44* (2013.01)
(Continued)

(52) U.S. Cl.
CPC .......... *G06F 9/44505* (2013.01); *G06F 21/44* (2013.01); *G06F 21/88* (2013.01);
(Continued)

(58) Field of Classification Search
CPC ...... G06F 9/44505; G06F 21/44; G06F 21/88; G06F 2221/2103; G06F 2221/2111;
(Continued)

(56) References Cited

U.S. PATENT DOCUMENTS 6,166,688 A   12/2000  Cromer et al.
6,643,781 B1  11/2003  Merriam
(Continued)

FOREIGN PATENT DOCUMENTS

WO   2013072774   5/2012

OTHER PUBLICATIONS

International Search Report and Written Opinion of the International Searching Authority, PCT Application Serial No. PCT/US2014/040275, dated Sep. 15, 2014, p. 9.

*Primary Examiner* — Umair Ahsan
(74) *Attorney, Agent, or Firm* — Aikin & Gallant, LLP

(57) ABSTRACT

A device locator mode or find my device (FMD) mode can allow a lost, stolen, or misplaced mobile device to be located. The FMD mode can be enabled or disabled on a mobile device. Sometimes thieves or unauthorized parties attempt to disable the FMD mode. To prevent this, the mobile device can transmit a unique device identifier to a remote server. The remote server can link the device identifier to a cloud-based user account associated with the user of the mobile device. Before an FMD mode is disabled on the mobile device, before the content or settings can be erased, and/or before a mobile device is permitted to be activated/reactivated, a user of the mobile device can be challenged for the credentials of the cloud-based user account. If valid credentials are provided, FMD can be disabled, the content or settings can be reset, and/or the device can be activated/reactivated.

18 Claims, 14 Drawing Sheets

Related U.S. Application Data continuation of application No. 16/560,570, filed on Sep. 4, 2019, now Pat. No. 11,669,338, which is a continuation of application No. 15/623,047, filed on Jun. 14, 2017, now Pat. No. 10,447,839, which is a continuation of application No. 13/911,732, filed on Jun. 6, 2013, now Pat. No. 9,706,032.

(51) Int. Cl.
*G06F 21/88* (2013.01)
*H04L 9/40* (2022.01)
*H04M 1/724* (2021.01)
*H04W 4/02* (2018.01)
*H04W 8/18* (2009.01)
*H04W 12/126* (2021.01)
*H04L 67/52* (2022.01)

(52) U.S. Cl.
CPC ............ *H04L 63/08* (2013.01); *H04M 1/724* (2021.01); *H04W 4/02* (2013.01); *H04W 8/18* (2013.01); *H04W 12/126* (2021.01); *G06F 2221/2103* (2013.01); *G06F 2221/2111* (2013.01); *G06F 2221/2117* (2013.01); *H04L 67/52* (2022.05)

(58) Field of Classification Search
CPC ........ G06F 2221/2117; H04W 12/126; H04W 4/02; H04W 8/18; H04M 1/724; H04L 63/08; H04L 67/18

See application file for complete search history.

(56) References Cited

U.S. PATENT DOCUMENTS

| | | |
|---|---|---|
| 6,662,023 B1 | 12/2003 | Helle |
| 7,890,083 B2 | 2/2011 | Chandran |
| RE43,070 E | 1/2012 | Henrie |
| 8,248,237 B2 | 8/2012 | Fitzgerald et al. |
| 8,370,168 B1 | 2/2013 | Jenkins et al. |
| 9,706,032 B2 | 7/2017 | Pai et al. |
| 2003/0087627 A1 | 5/2003 | Cannon |
| 2005/0108107 A1 | 5/2005 | Grayson |
| 2008/0057947 A1 | 3/2008 | Marolia et al. |
| 2010/0210240 A1 | 8/2010 | Mahaffey et al. |
| 2010/0279652 A1 | 11/2010 | Sharp et al. |
| 2010/0279673 A1 | 11/2010 | Sharp et al. |
| 2010/0279675 A1 | 11/2010 | Slack et al. |
| 2012/0302256 A1 | 11/2012 | Pai et al. |
| 2013/0078951 A1 | 3/2013 | Mun et al. |
| 2013/0246213 A1 | 9/2013 | Lee et al. |
| 2014/0364099 A1 | 12/2014 | Pai et al. |
| 2015/0189510 A1 | 7/2015 | Enright et al. |
| 2017/0289333 A1 | 10/2017 | Pai et al. |

# DEVICE LOCATOR DISABLE AUTHENTICATION

CROSS-REFERENCE TO RELATED APPLICATION

This application is a continuation of U.S. patent application Ser. No. 16/565,202, entitled "Device Locator Disable Authentication," filed Sep. 9, 2019, which is a continuation of U.S. patent application Ser. No. 16/560,570, entitled "Device Locator Disable Authentication," filed Sep. 4, 2019, which is a continuation of U.S. patent application Ser. No. 15/623,047, entitled "Device Locator Disable Authentication," filed Jun. 14, 2017, which is a continuation of and claims priority to U.S. patent application Ser. No. 13/911,732, entitled "Device Locator Disable Authentication," filed Jun. 6, 2013, all of which are incorporated herein by reference.

BACKGROUND

The present disclosure relates to computing devices and, more specifically, to authentication after a device locator mode has been enabled on a computing device.

Modern advances in computing devices have resulted in smaller, more powerful and wirelessly networked computing devices that can be easily carried by users at all times. As a result, these devices are relied on greatly by their owners and often are trusted to carry their owner's personal and sensitive information.

Naturally, theft of such devices has increased as thieves are attracted to the high resale price and high demand for such computing devices as well as the possibility to steal personal information of the owner of the computing device. The high price and demand of a computing device can also tempt a non-thief who finds a lost computing device to keep the device rather than search for its rightful owner. Alternatively, a person who finds a lost device and intends to return it may find it difficult to locate the owner.

Current systems attempt to address these problems by providing the location of the device to an owner of a lost device; however, these types of systems can break down when a thief turns off the location feature, erases the device, or turns the device off. Other systems allow the lost device to be locked to deter theft. Again, the thief may erase the device to get around this. Other systems allow for erasing the device remotely so that personal or sensitive data stored on the lost device is protected. One problem with remotely erasing a device is that often the device is no longer locatable after the device is erased. As an unintended consequence, remotely wiping a device can actually help a thief by making the device harder to find or identify.

Embodiments of the invention address these and other problems both individually and collectively.

SUMMARY

Additional features and advantages of the disclosure will be set forth in the description which follows. These and other features of the disclosure will become more fully apparent from the following description and appended claims, or can be learned by the practice of the principles set forth herein.

In some embodiments, a Find My Device (FMD) mode is enabled on a mobile device and a hardware identifier for the mobile device is associated with a cloud-based account identifier and account credentials. The mobile device may or may not be protected with a local passcode lock. Subsequently, a user can disable the FMD mode through a settings menu (e.g., Settings>Location Settings>Turn Off Find My Device). The FMD mode can be disabled in a number of other ways, including deleting a cloud-based user account from the mobile device (e.g., deleting an iCloud account in a settings menu), resetting settings or data (e.g., Settings>General>Reset), and the like. When the user attempts to change a setting on the mobile device that disables the FMD mode, the user of the mobile device can be challenged for the credentials. The mobile device can disable the FMD mode when valid credentials are provided or remain in FMD mode when invalid credentials are provided. This can prevent a thief or other unauthorized person from disabling the FMD mode on the device.

In some embodiments, an FMD mode is enabled on a mobile device and a hardware identifier for the mobile device is associated with a cloud-based account identifier and account credentials. Subsequently, the content or settings of the mobile device are erased. After a device is wiped or erased, a reactivation may be required before the device is useable to its full functionality. Erasing the content or settings may, by default, disable the FMD mode on the mobile device. When that mobile device attempts to reactivate, reauthorize, or the like, the user of the mobile device may be challenged for the credentials. The mobile device can be reactivated when valid credentials are provided or denied reactivation when invalid credentials are provided. This can prevent a thief or other unauthorized person from using a wiped device or device that has been otherwise erased.

DETAILED DESCRIPTION

Figure 1:
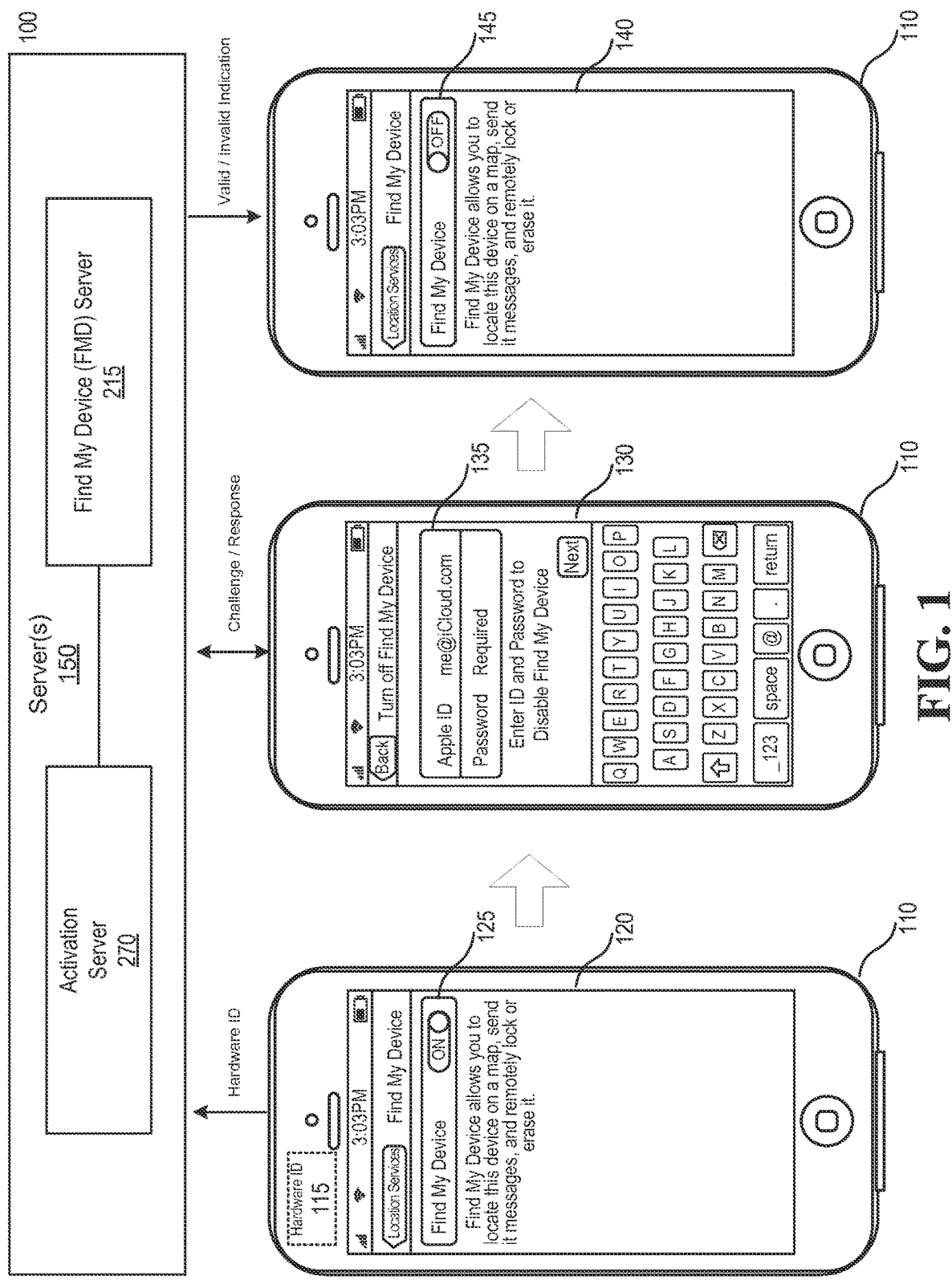
FIG. 1 illustrates a high-level block diagram of a system for remotely authenticating a user of a mobile device with a device locator mode enabled according to some embodiments of the present invention.

Various embodiments of the disclosure are discussed in detail below. While specific implementations are discussed, it should be understood that this is done for illustration purposes only. A person skilled in the relevant art will recognize that other components and configurations may be used without departing from the spirit and scope of the disclosure.

Various systems exist for remotely locating mobile user devices, remotely sending messages to those devices and/or remotely erasing those devices to preserve sensitive data. U.S. patent application Ser. No. 12/434,586 (filed on May 1, 2009 and published as U.S. Pub. No. 2010/0279652), Ser. No. 12/434,582 (filed on May 1, 2009 and published as U.S. Pub. No. 2010/0279673), and Ser. No. 12/750,600 (filed on Mar. 30, 2010 and published as U.S. Pub. No. 2010/0279675) describe various methods, systems and apparatuses for remotely locating and commanding a mobile device. U.S. patent application Ser. No. 13/488,438, filed on Jun. 4, 2012, describes systems, methods, and apparatuses for remotely initiating a lost mode on a computing device. Each of these applications is hereby incorporated by reference in their entirety for all purposes.

One problem faced by device locator systems is that thieves or others can disable these systems so that the mobile computing devices can no longer be located, communicated with, and/or remotely erased. Additionally, thieves are getting more sophisticated. Certain embodiments of the present invention address the growing sophistication of thieves and others in the illicit trade of stolen or lost devices. There are numerous ways a device locator mode can be disabled or turned off. For example, an FMD mode can be turned off in a settings menu of the mobile device. This can be especially easy for an unauthorized party to do if a local passcode lock does not protect the device and/or the passcode lock timeout has not occurred. In another example, an FMD mode may be disabled by removing a SIM card from the device. In yet another example, a device may be erased or restored. For example, a mobile device can be restored to factory settings using the mobile device itself or by using a separate user computing device in communication with the mobile device (e.g., iTunes to restore to factory settings on an iPhone). In still another example, a device may be put into a device firmware update (DFU) mode, which can disable the FMD mode. Another example is that a user account associated with an FMD mode may be deleted from the device (e.g., in the case of commercially available Find My iPhone, a user's Apple ID account can be deleted from the device, thereby disabling Find My iPhone). Other ways of disabling FMD may be possible and for security reasons they will not be described in detail here.

Passcode locks on mobile devices can temporarily prevent someone from disabling a device locator mode on a mobile device. Some passcode locks suppress all or some of the user interface elements that would allow access to data and/or applications on a mobile device and thus render the device in a useless locked state. Typically, passcodes are stored on a mobile device's memory. When in a locked state, the mobile device has limited functionality and prompts a user for input of a secret code (e.g., a passcode). The user can input the passcode. In response to the user entering the passcode, the mobile device itself (typically without exchanging messages with a remote server computer) determines whether or not the passcode is valid. For example, a processor on the device compares the user-entered passcode to the stored passcode. If the passcode is valid, the mobile device unlocks itself and becomes useable. If the passcode is invalid, the mobile device can remain in a locked state. However, this method too is vulnerable to device resets, device erases, and DFU mode resets because the passcode memory can be overwritten or modified in a manner that circumvents the passcode protection. Therefore, a system that more robustly addresses the growing sophistication of thieves and others is needed.

A hardware identification can be associated with cloud-based user account credentials. The hardware identifier can be any immutable and/or unchangeable identifier of unique hardware. The cloud-based user account credentials can be any suitable credentials that are stored by and/or verified by a remote server computer in communication with the mobile device. For example, cloud-based user account credentials are verified by a remote server computer by an exchange of messages between a mobile device and server using a network. Cloud-based user account credentials can provide an external verification technique. On the other hand, local passcode locks and the like are verified locally by the device itself. Local passcode locks can be verified without a network connection. Cloud-based authentication uses a network connection, such as the Internet.

In some embodiments, an FMD mode is activated on a mobile device and a hardware identifier for the mobile device is associated with a cloud-based account identifier and account credentials. Subsequently, the content or settings of the mobile device are erased or reset. Erasing the content or settings may, by default, disable the FMD mode on the mobile device. When that mobile device attempts to reactivate, reauthorize, or the like, the user of the mobile device may be challenged for the credentials. The mobile device can be reactivated when valid credentials are provided or denied reactivation when invalid credentials are provided. This can prevent a thief or other unauthorized person from using a wiped device.

In some embodiments, an FMD mode is activated on a mobile device and a hardware identifier for the mobile device is associated with a cloud-based account identifier and account credentials. Subsequently, a user can disable the FMD mode through a settings menu. When the user attempts to change a setting on the mobile device that disables the FMD mode, the user of the mobile device may be challenged for the credentials. The mobile device can disable the FMD mode when valid credentials are provided or remain in FMD when invalid credentials are provided. This can prevent a thief or other unauthorized person from disabling the FMD mode on the device.

FIG. 1 illustrates a high-level block diagram of a system 100 for remotely authenticating a user of a mobile device with a device locator mode enabled according to some embodiments. System 100 includes a mobile device 110 and one or more servers 150. Servers 150 can include an activation server 270 for activating a mobile device and a find my device (FMD) server 215 for locating mobile devices. Activation server 270 and FMD server 215 could be implemented as one or more distinct servers and are described in more detail below. Mobile device 110 is shown with a sequence of three sample user interfaces 120, 130, and 140 that could be used in some embodiments. Mobile device 110 has a hardware identifier 115, which is a hardware element that uniquely identifies the mobile device 110. In some embodiments, hardware identifier 115 cannot be changed and/or is not erasable or programmable once set.

Turning to a simplified example, a mobile device can be activated to enable one or more functionalities. For example, an iPhone® commercially available from Apple may need to be activated in order for it to be useable as a phone. A mobile device can be activated by navigating through various screens, selecting options and/or entering information into the mobile device. The mobile device can configure on-board settings in accordance with the user input. The mobile device can send messages to, and communicate with, an activation server, which can store information relating to the activation (e.g., opt-ins, opt-outs, cloud-based account information, etc.).

In some embodiments, as part of the activation process, the mobile device can transmit a hardware identifier to one or more servers (e.g., the activation server). Device activation may include sending device information, such as a hardware identifier, to a remote server. The hardware identifier, for example, could be a serial number, International Mobile Station Equipment Number (IMEI), electronic serial number (ESN), or other suitable hardware identifier that uniquely identifies the device hardware.

In some embodiments, a cloud-based user account can be set up on the mobile device. Cloud-based user accounts can have an account identifier and account credentials, such as a password, associated with them for identifying the account and authenticating the user. Account identifiers and account credentials for the cloud-based account are different from locally stored passwords/passcodes in that account credentials are verified using a remote server computer, rather than a processor that is part of the mobile device. Authentication credentials may include an account identifier, a user identifier, a password, and other data that can authenticate the user.

In some embodiments, the account identifier and/or credentials for the cloud-based account can be stored in a secure memory of the mobile device such that it cannot be accessed by a thief or other unauthorized party. For example, a user name and password can be encrypted and stored such that a cloud-based service is available on the device without the user needing to repeatedly enter in the credentials. This can also provide user access to the various features of the cloud-based user account without the account credentials being available to copy from the mobile device memory.

In some embodiments, a device locator mode (or find my device mode) can be enabled by the user as part of the activation process or thereafter. When the mobile device is operating in device locator mode, authorized requesting user devices can receive location information of the mobile device. In some embodiments, the device cannot be located unless device locator mode is enabled.

When a device locator mode is enabled, messages can be sent to one or more servers (e.g., activation server 270 and/or FMD server 215). Responsive to receipt of a message to enable the device locator mode (or a message indicating that a device locator mode has been enabled on the mobile device), the servers may link the hardware ID of the mobile device to the cloud-based account credentials. In some embodiments, the hardware identifier may be linked to cloud-based user account authentication credentials in an activation record. The activation record can be stored in a database on a remote server. In some embodiments, this linkage can occur automatically when the device locator mode is enabled. In some embodiments, the user may be presented with a prompt that asks whether the user would like to enable the protections provided by linking the hardware ID to the cloud-based account credentials.

In some embodiments, a user may attempt to disable the device locator mode. This may be done by an authorized user of the device or by an unauthorized user. User interface 120 shows one example of how a device locator mode can be disabled. For example, in the Settings or Location Services menu, a user can toggle off a button 125 to disable the device locator mode. Responsive to toggling button 125, the mobile device can send hardware ID 115 to a server.

The server can receive hardware ID 115 and determine whether or not hardware ID 115 is associated with a mobile device that had previously enabled a device locator mode. The server can send a challenge, or initiate the sending of a challenge, to mobile device 110. The challenge can include a challenge for the credentials for the cloud-based account previously associated with the particular hardware ID provided by mobile device 110.

User interface 130 shows one example of how a challenge could be presented to a user for the account credentials in response to a user request to disable a device locator mode. User interface 130 can include one or more fields 135 for a user to enter account credentials. After a user enters credentials, the credentials can be sent to the server for validation. One or more servers can determine whether the account credentials are valid and send a response indicating that the credentials are valid (or invalid).

If the credentials are valid, the mobile device can disable the device locator mode. In this circumstance, user interface 140 can include a toggle button 145 that indicates that the device locator mode is OFF. If the credentials are invalid, the mobile device can continue to operate in device locator mode. In some embodiments, a prompt can be displayed indicating that the device is continuing to operate in device locator mode because the proper credentials have not been provided. In some embodiments, a device is made unusable if invalid credentials are provided after a threshold number of attempts. In some embodiments, a device locator mode cannot be disabled without authentication to a remote server.

User interfaces 120, 130, and 140 show one example of how an FMD mode could be disabled. There are numerous other ways that an FMD mode could be disabled, including resetting settings on a device, erasing a device, restoring a device to a previous configuration, and the like. In some embodiments, when a device has been reset/restored/erased, the mobile device can be prohibited from activating until the user is authenticated by a remote server computer. One having skill in the art will recognize that other ways for disabling an FMD mode are possible and contemplated within the scope of the present invention. Some of these other methods are described in more detail below.

I. Find My Device System

Figure 2:
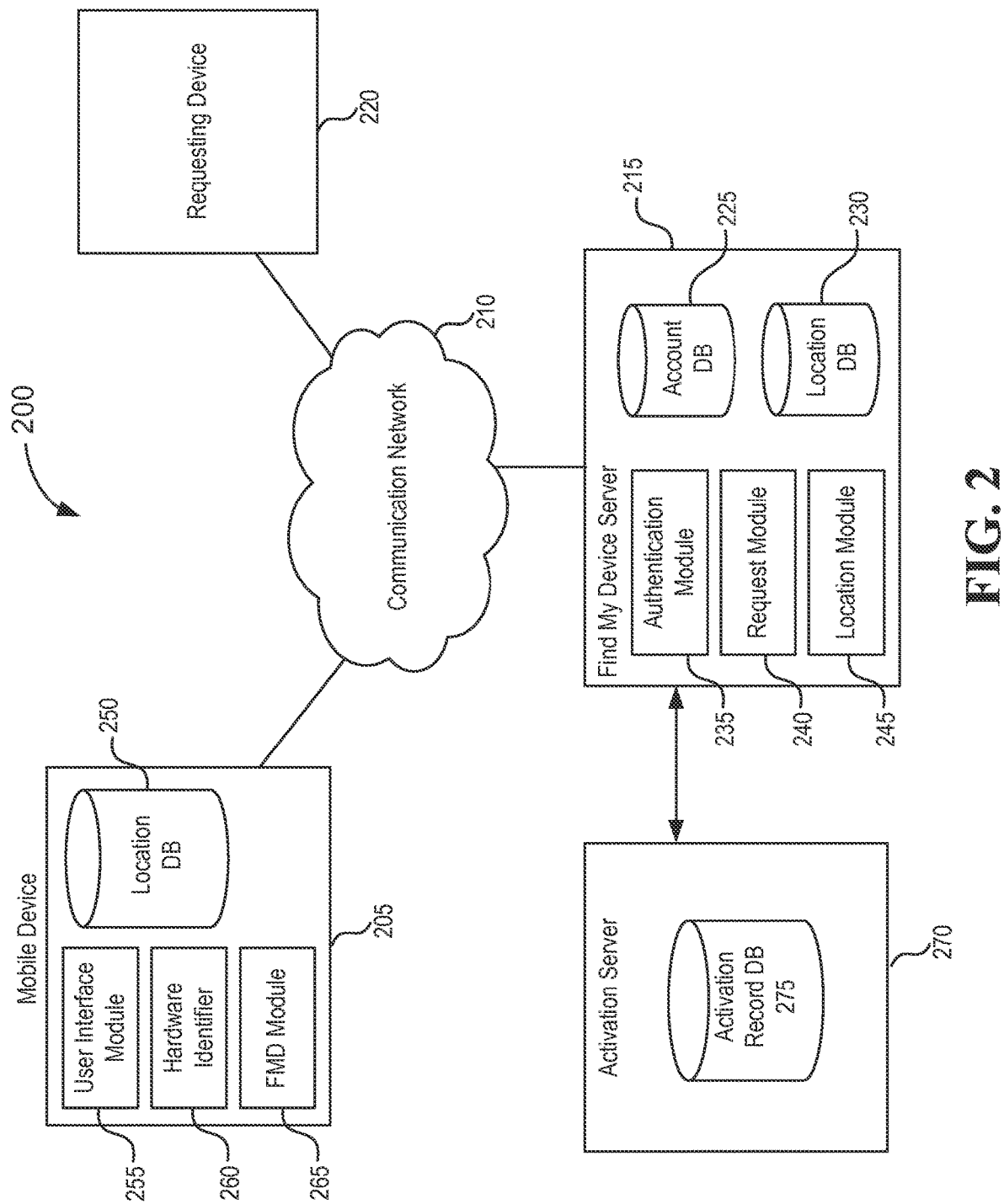
FIG. 2 illustrates a system including computing devices in network communication with each other according to some embodiments of the present invention.

As illustrated in FIG. 2, an exemplary system includes computing devices in network communication with each other, a mobile user device 205, a Find My Device (FMD) server 215, an activation server 270, and a requesting user device 220. The system illustrated in FIG. 2 can be configured to allow requesting device 220 to locate mobile device 205 when an FMD mode is enabled on mobile device 205.

As illustrated, FMD server 215 can contain a number of components. The components can include one or more databases for storing data relevant to the operation of FMD server 215, e.g., an account database 225 and a location database 230; and one or more modules or interfaces for interacting with the databases and/or controlling the features provided by the FMD server 215, e.g., an authentication module 235, a request module 240 and a location module 245. Each of these components is discussed in more detail below; however, it should be understood to one skilled in the art that the configuration illustrated is simply one possible configuration and that other configurations, with more or less components, are possible.

FMD server 215 can include an account database 225 configured to store a user profile for each of a plurality of users. A user's profile can include a variety of information about the user, for example the information can include a user name, password, a list of all computing devices owned by the user, an identifier for each computing device owned by the user, user specified preferences, contact information, demographic information, etc.

FMD server 215 can also include an authentication module 235, configured to communicate with account database 225 and authenticate that a user requesting the location of mobile device 205, for example, has permission to make the request. In another example, authentication module 235 can be configured to communicate with account database 225 and authenticate that a user has permission to disable an FMD mode on mobile device 205. In yet another example, authentication module 235 can be configured to communicate with account database 225 and authenticates that a mobile device is permitted to be reset or reactivated. To properly authenticate a user, authentication module 235 can be configured to prompt the user to enter authenticating information, such as a user name and password. The password can be any type of password known to those skilled in the art such as a numeric pin, character password, gesture, etc.

To confirm that the authentication information received from the requesting user is correct, authentication module 235 can be configured to communicate with account database 225 to confirm that the given user name and password match a user profile in account database 225. If the given user name and password matches a user profile stored in account database 225, the requesting user can be authenticated as having permission to receive location information of mobile device 205, disable an FMD mode on mobile device 205, or reactivate mobile device 205. Although a user name and password are used as an example, one skilled in the art would recognize that any variety of authenticating information can be requested from the user, including personal information or answers to predetermined security questions.

In some embodiments, requesting device 220 can include a web browser application configured to request access to FMD server 215 via the communication network 210. In some embodiments, authentication module 235 and request module 240, either entirely or partially, can be running on requesting device 220 and the requesting user can access modules 235, 240 from requesting device 220 to create the request.

FMD server 215 can also include a location module 245 configured to receive location data from mobile device 205 and transmit the location to the requesting user. The location data can include data indicating the location of mobile device 205 as well as the time mobile device 205 was at the location. Once received, location module 245 can be configured to transmit the location data to the requesting user in numerous ways. For example, in some embodiments, the location data can be sent to requesting device 220. Location module 245 can determine whether requesting device 220 is available, and if available, send the location date. If requesting device 220 is not available, location module 245 can be configured to store the location data in a location database 230 on FMD server 215 until requesting device 220 is available.

Figure 12:
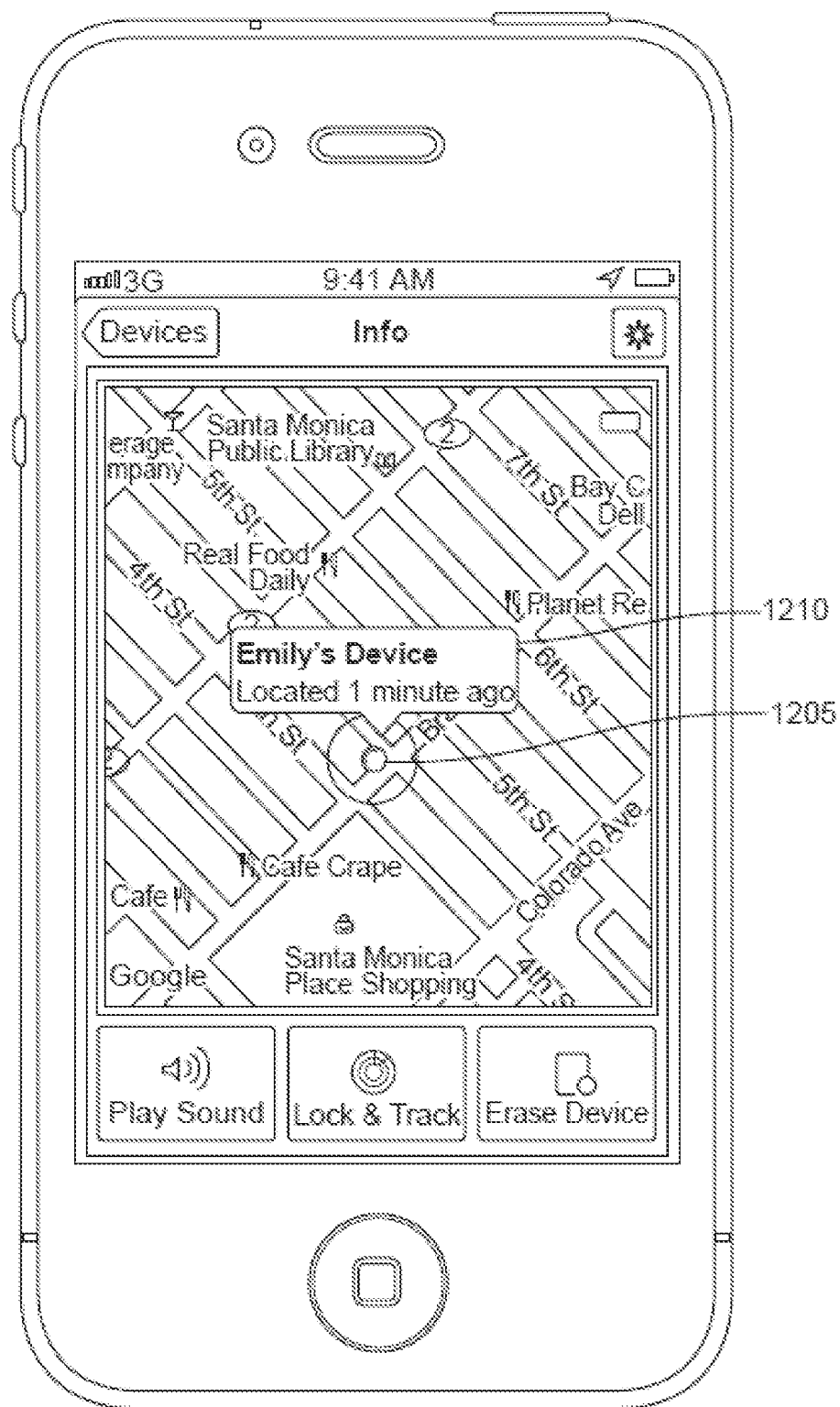
FIG. 12 illustrates an embodiment of location data being presented according to some embodiments of the present invention.
Figure 13:
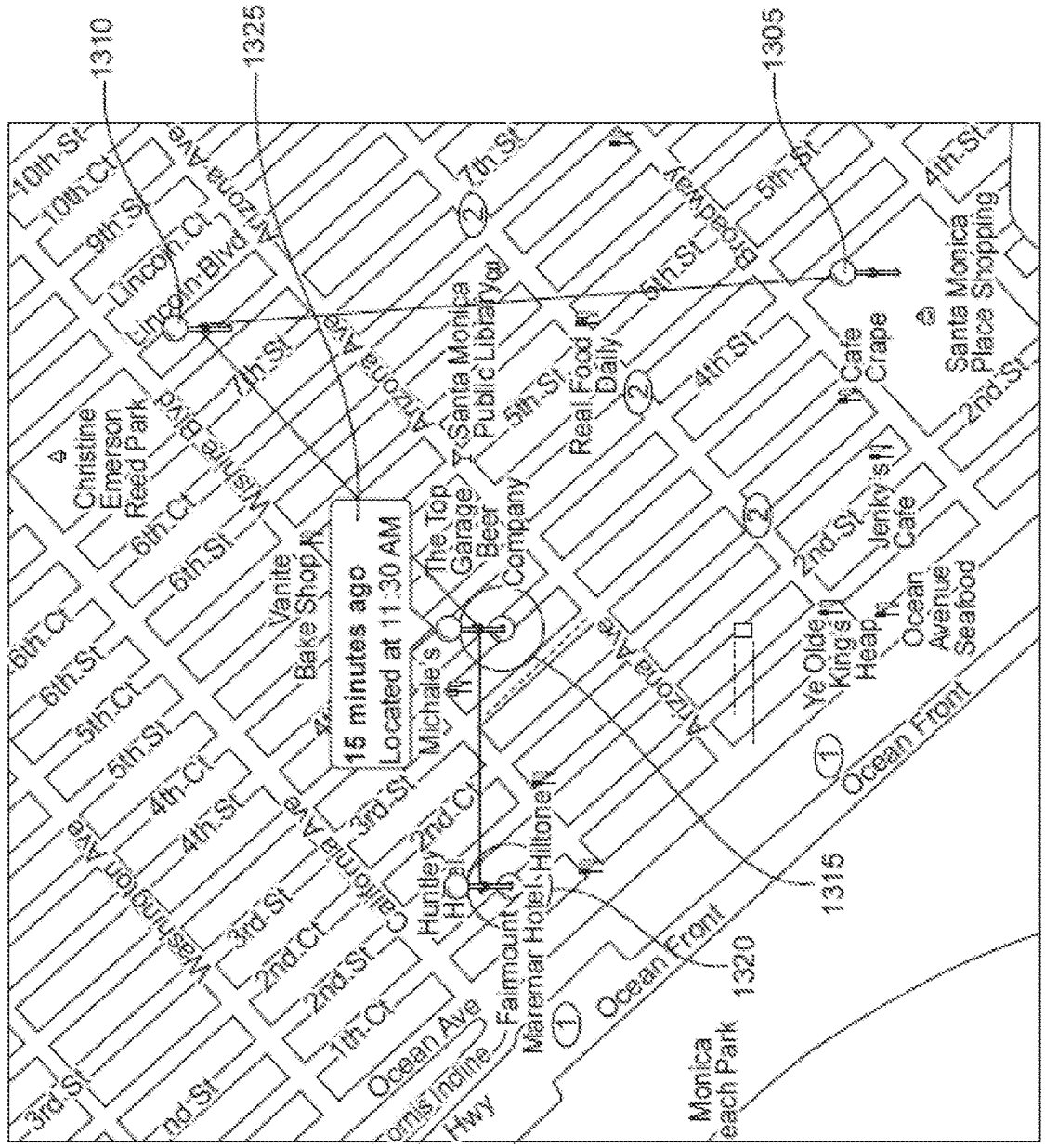
FIG. 13 illustrates an embodiment of location data being presented according to some embodiments of the present invention.

The location data can be presented to the requesting user in numerous ways. In some embodiments, the location data can be presented to the requesting user on a map that tracks the movement of mobile device 205. FIGS. 12 and 13 are two such examples. In some embodiments, the location data can be presented to the requesting user by giving the street address or GPS coordinate of mobile device 205.

The location data can also be sent to the requesting user in numerous ways. For example, in some embodiments, the requesting user can log into web interface or application configured to communicate with location module 245 to view the location of the mobile device. In some embodiments, the location data can be e-mailed to the owner of the user device. In some embodiments, the location data can be sent to requesting device 220 via a push notification to immediately update the requesting user of the location of mobile device 205. Although the above examples of sending location data are described, these examples are not meant to be limiting and are just a few possible embodiments. One skilled in the art would recognize that there are numerous ways to send and present data.

Mobile device 205 can contain a number of components. The components can include one or more databases for storing data relevant to the operation of the device and one or more modules or interfaces for interacting with the databases and/or controlling the features provided by the mobile user device, e.g., a user interface module 255, hardware identifier 260, and Find My Device (FMD) module 265. Each of these components is discussed in more detail below; however, it should be understood to one skilled in the art that the configuration illustrated is simply one possible configuration and that other configurations, with more or less components, are possible.

Mobile device 205 can include a user interface module 255 configured to manage the user interface on mobile device 205. This can include displaying all user interface elements on the device such as icons, buttons, controls, date, time, notifications, alerts, etc.

Mobile device 205 can include a hardware identifier that uniquely identifies mobile device 205. Information uniquely identifying the mobile device can include a serial number, a telephone number, a Subscriber Identity Module (SIM) card, a Media Access Control (MAC) address, or an International Mobile Equipment Identity (IMEI). In some embodiments, the information identifying the mobile device can be a unique device identifier (UDID), which can be a hash, e.g., generated using a Secure Hash Algorithm, of hardware identifiers associated with the mobile device. In some embodiments, the unique identifier can be obtained by servers from the mobile device automatically. Thus, data entry errors can be avoided.

Mobile device 205 can also include an FMD module 265 configured to provide location data to FMD server 215 and/or requesting device 220. For example, in some embodiments, the FMD module 265 can be a daemon running in the background on mobile device 205 and configured to communicate with the operating system to initiate applications and modules running on mobile device 205 as well as control hardware components of mobile device 205.

In some embodiments, FMD module 265 can be configured to transmit location data to the requesting user. For example, FMD module 265 can be configured to collect location data from a GPS component of mobile device 205 and periodically send the location data to the requesting user. The location data can be any type of data that can identify the location of the mobile device. For example, the location data can be GPS coordinates, a street address, etc. In addition, the location data can include the time that the mobile device was at the specified location. For example, FMD module 265 can be configured to receive the time from an internal clock running on mobile device 205.

In some embodiments, the FMD module 265 can be configured to send the location data to FMD server 215, which then sends the location data to the requesting user. In some embodiments, FMD module 265 sends the location data to requesting device 220. In some embodiments, the FMD module determines whether requesting device 220 is available to receive the location data, and if so, send the location data to requesting device 220, but if the requesting device is not available, FMD module 265 sends the location data to FMD server 215. In some embodiments, FMD module 265 sends the location data to a personal account associated with the requesting user, such as the requesting user's e-mail account. Although the above examples of sending location data to a requesting user are described, these are just possible embodiments and are not meant to be limiting. One skilled in the art would recognize that the location information can be sent to the requesting user in numerous other ways.

Activation server 270 can store information related to the activation process, including the hardware ID. Hardware identifiers and user account information may be stored in an activation record database 275. An entry in activation record database 275 can include a hardware identifier for a mobile device and user credentials for an account of a user of the mobile device. The user credentials can be an account identifier and/or authentication data.

In some embodiments, activation server 270 and FMD server 215 can be implemented on the same server computer. In some embodiments, activation server 270 and FMD server 215 can be implemented on different server computers and/or can be remote from one another. In some embodiments, activation server 270 and FMD server 215 are operated and maintained by different entities, while in other embodiments they are operated by the same entity. An advantage to the same operating entity controlling both activation server 270 and FMD server 215 is that information can be more easily shared between the servers and the system can be more secure.

II. Find My Device Methods

Various methods are described below. One having skill in the art will recognize that the following methods are exemplary in nature and that various modifications can be made without departing from the scope of the present invention. One or more steps may not be shown for clarity and the order of one or more steps can be modified. Some of the modifications in order are specifically described, while other modifications to the order of the process will be apparent to one having skill in the art.

Figure 3:
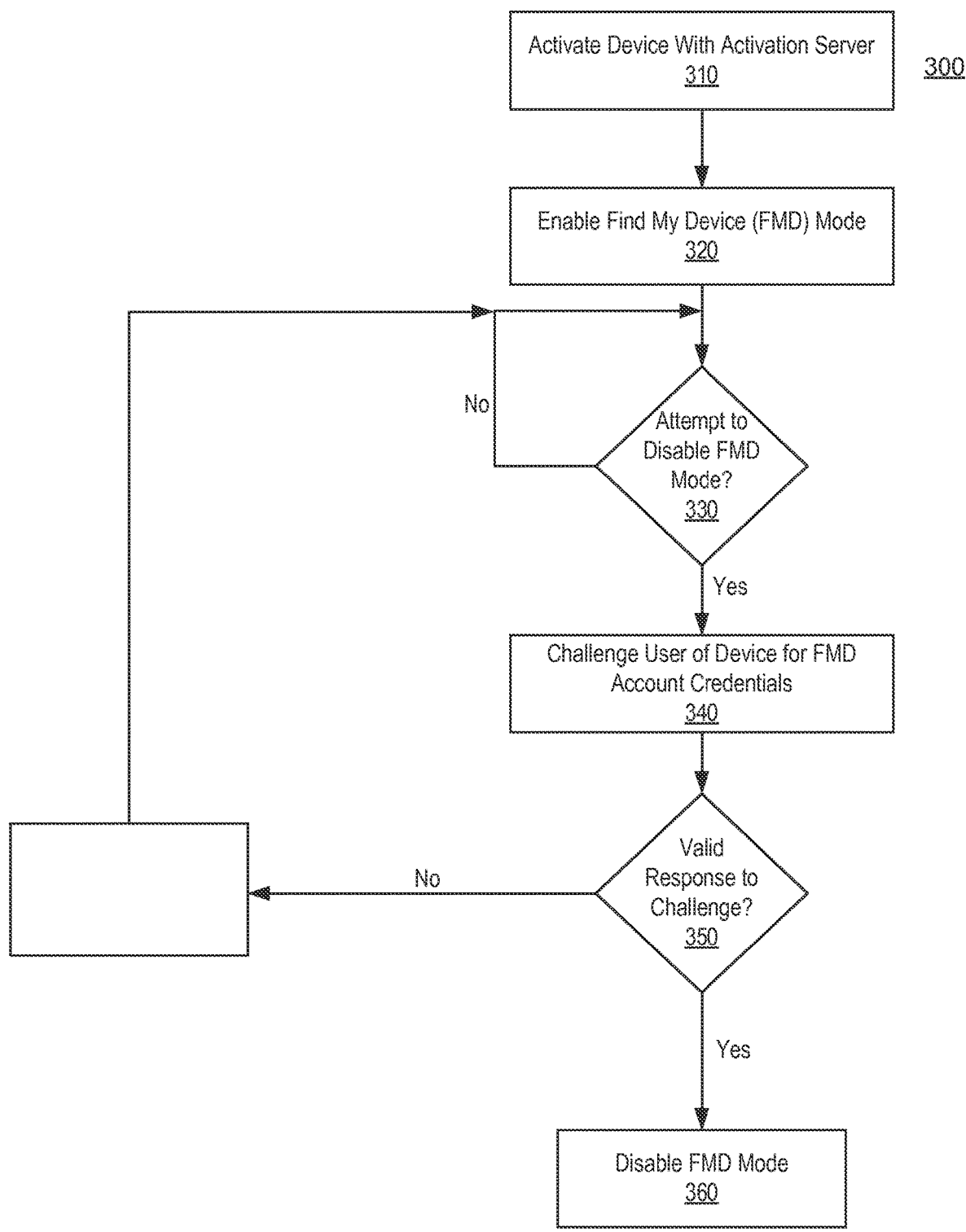
FIG. 3 illustrates a high-level process flow of a method of device locator disable authentication according to some embodiments of the present invention.

FIG. 3 illustrates a high-level process flow of a method 300 of device locator disable authentication according to some embodiments of the present invention. Method 300 can be used to prevent an unauthorized third party from disabling an FMD mode of a mobile device (e.g., mobile device 110 in FIG. 1 or 205 in FIG. 2). Method 300 can also be used to permit a rightful possessor of a mobile device to turn off an FMD mode on the device as needed.

At block 310, a user can activate a mobile device with an activation server. In some embodiments, a mobile device needs to be activated before it can be used and/or used to its full functionality. For example, a mobile device may need to be activated to be used as a mobile phone or as a wireless Internet device. In some embodiments, the mobile device is not useable or certain features are not available until the mobile device is activated. Activating the device can initialize one or more settings on the device or on a remote server in communication with the mobile device. Sometimes—for example, after a device has been restored to factory settings—a device may have to be reactivated before it can be used and/or used to its full functionality.

In some embodiments, a setup assistant software module facilitates the set up process and provides various user interfaces to guide a user through the activation process. In some embodiments, the activation process includes user interfaces for the user to select a country, select a Wi-Fi network, set up email, opt into location services, opt into or out of various other services, or the like. In some embodiments, the activation process includes prompting the user for cloud-based user account credentials, such as a user name and a password. In some embodiments, the user may be prompted to create a cloud-based user account, while in others the user can enter account credentials for an account that has been previously created.

In some embodiments, the activation process might occur with limited or no user input (e.g., with limited or no prompting from setup assistant software). For example, a software backup of a mobile device may have been created. In some embodiments, when a software backup is used to restore or initialize a device, one or more of the user interfaces prompting the user for user input may be omitted and the software backup may be used instead. For example, a user might upgrade to a new device. The mobile device may be initialized from a backup. In another example, a user might restore a device from a backup.

In some embodiments, the software backup is stored in the cloud (e.g., an iCloud account backup). In some embodiments, the software backup can be stored on a separate computing device (e.g., a personal computer). For example, a backup created in the syncing process with a software program can be stored on a separate computing device (e.g., iTunes on a computer). The backup can be used to restore factory settings on a mobile device in communication with the separate computing device.

At block 320, an FMD mode can be enabled on the device. In some embodiments, enabling of the FMD mode can occur as part of the activation process. For example, the activation process can include a user interface for enabling an FMD mode on the mobile device. In some embodiments, FMD mode can be enabled at a later time (e.g., after the activation process is completed). For example, a setting menu can be provided for a user to turn on an FMD mode on the mobile device. In some embodiments, if an FMD mode was enabled on the backup used to restore or initialize the device, then an FMD can be enabled when the device is restored or initialized. For example, a mobile device may have had the FMD mode enabled when a backup of that device was created. When the device backup is used to initialize or restore a device, FMD mode can be enabled based on the backup.

When the FMD mode is enabled on a mobile device, a server can associate a device hardware identifier of the mobile device with the cloud-based user account credentials.

The associated hardware identifier and user account credentials can be stored in a database in communication with the server.

At block 330, the mobile device or a server can determine whether or not there has been an attempt to disable an FMD mode on the mobile device. For example, a user of the device may attempt to disable an FMD mode using various provided user interfaces on the mobile device (e.g., disabling FMD mode in a settings menu). In another example, the mobile device may have been erased or restored to factory settings, for example, and a server can recognize this as an implicit attempt to disable FMD mode. In some embodiments, if there has not been an attempt to disable FMD mode on the device, the mobile device remains in the FMD mode.

In some embodiments, before the software running on the separate computing device will permit the restore/erase, the software program may determine whether the mobile device has an FMD mode enabled. If an FMD mode is enabled, the user may be challenged for account credentials as described herein. In some embodiments, when a mobile device in DFU mode is connected to a syncing software on a separate computing device, the syncing software (e.g., iTunes) can challenge a user for the user account credentials (e.g., Apple ID and password).

At block 340, when it is determined that there was an attempt to disable the FMD mode on the device, a challenge can be sent to a mobile device by a server computer and can be presented to the user. In some embodiments, the challenge is for the cloud-based user account identifier, password, and/or other user account credentials. For example, the user can be challenged for credentials associated with an FMD account, for example. Other cloud-based accounts can be used. The challenge and response can be received and entered, respectively, into either or both of the mobile device or/and the separate user computing device. For example, the display on the mobile device may present the user with the challenge, and the user can enter a challenge response into the device with a user input element. The challenge response can be sent to a server in communication with the mobile device. For example, the response can be sent to the server computer that issued the challenge.

At block 350, the challenge response can be evaluated to determine whether the response is valid. In some embodiments, a server computer in communication with the mobile device evaluated whether the challenge response is valid. For example, the server can look up the account credentials associated with the hardware identifier for the mobile device. The server can compare the user-entered challenge response with the stored account credentials and determine if there is a match.

If the challenge response does not include valid user account credentials, then the device remains in FMD mode (block 355). In some embodiments, if the challenge response does not include valid user account credentials, the device may be prohibited from certain functionalities (e.g., the device may be denied full activation). If the challenge response is invalid, then activation may be prohibited and/or the mobile device may remain in an FMD mode. In some embodiments, the server sends instructions denying activation or prohibiting an FMD mode change.

If the challenge response is valid, then FMD mode can be disabled on the device (block 360). In some embodiments, the server transmits a message indicating that the challenge response was valid and that FMD mode can be disabled. In some, embodiments, the server transmits an instruction to disable FMD on the device.

Figure 4:
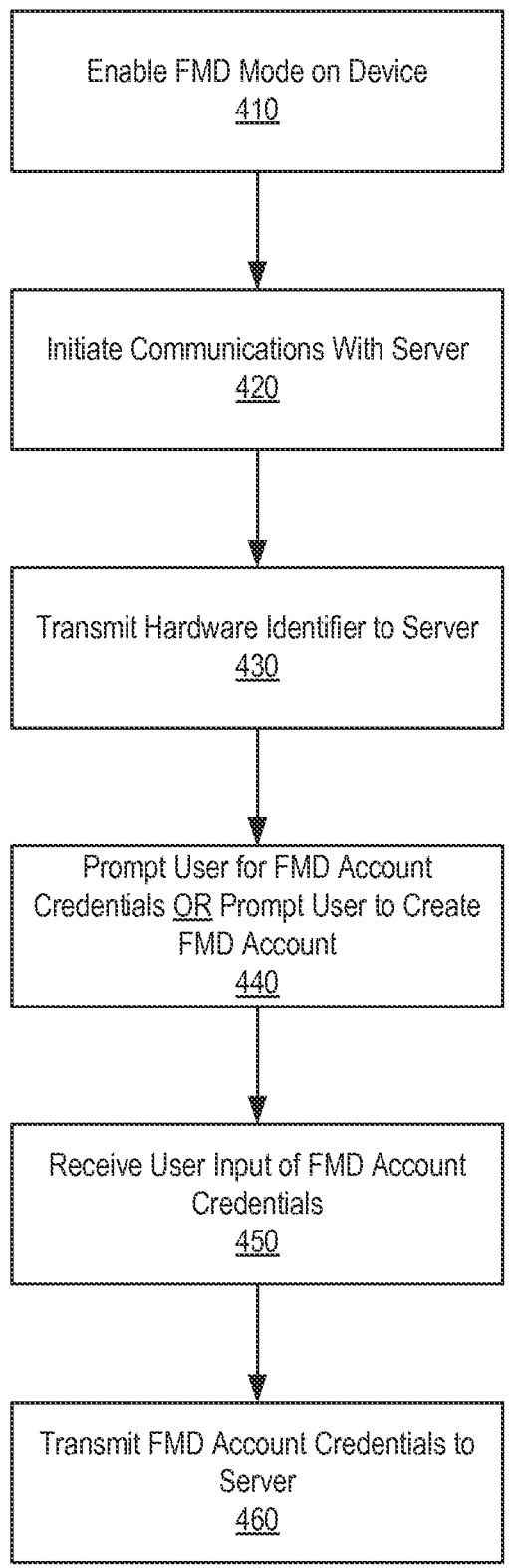
FIG. 4 illustrates a high-level process flow of a method of enabling an FMD mode on a mobile device according to some embodiments of the present invention.

FIG. 4 illustrates a high-level process flow of a method 400 of enabling an FMD mode on a mobile device according to some embodiments of the present invention. A mobile device can perform method 400 during or after the activation process. At block 410, an FMD mode of a mobile device can be enabled. In some embodiments, enabling the FMD mode can occur by a user selecting a setting. In some embodiments, enabling FMD mode can occur as part of a restore/initialization process.

Responsive to the enablement of the FMD mode on the mobile device, at block 420, the mobile device may initiate communication with a server. As part of the communications, at block 430, the mobile device may transmit a hardware identifier or another identifier that uniquely identifies the hardware of the mobile device to a remote server computer. In some embodiments, a hardware identifier is transmitted from the mobile device to the server computer. In some embodiments, information linked to a unique identifier of the mobile device is transmitted from the mobile device to the server computer.

At block 440, the user may be prompted for FMD account credentials (e.g., an account ID and/or account password data associated with an account). In some embodiments, the account is an account that provides an FMD service. In some embodiments, the account is a general account that provides various cloud computing services and the like. That is, although the figures illustrate an FMD account, one having skill in the art will recognize that other cloud-based account and credentials can be used without departing from the scope of the invention. In some embodiments, if the user does not have an account, the use may be prompted to create an account.

Regardless of whether the user has a previously created account ID and password or whether the user created a new account ID and password, at block 450, the mobile device receives input of the account credentials (e.g., account ID and/or the password). For example, the user may enter in the account credentials using a user input element on the mobile device.

In some embodiments, blocks 440 and 450 can be omitted and/or be performed earlier in the process flow. For example, a user might provide an FMD account ID and password before enabling an FMD mode on the device.

At block 460, the mobile device transmits the account credentials to a remote server computer. As discussed herein, the remote server computer can link or associate the device identifier with the account ID and/or password. Linked hardware identifiers and account credentials can be stored on the server computer or in another system. Later, the linked hardware identifiers and account credentials can be used to determine whether or not the FMD mode on the mobile device can be disabled and/or whether a mobile device is permitted to activate/reactivate.

Figure 5:
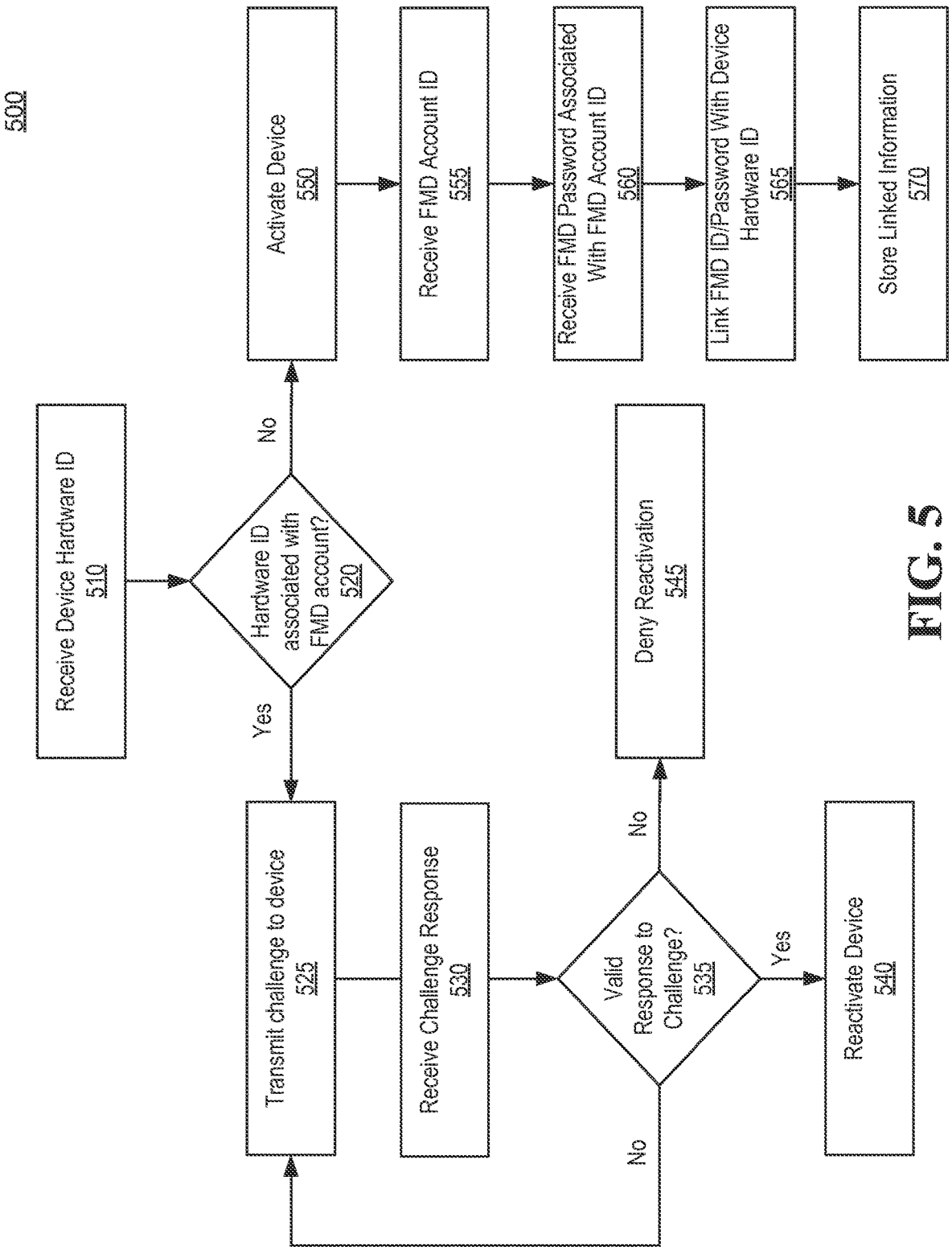
FIG. 5 illustrates a high-level process flow of a method of determining whether to allow an FMD mode on a mobile device to be disabled according to some embodiments of the present invention.

FIG. 5 illustrates a high-level process flow of a method 500 of determining whether to allow a mobile device to activate/reactivate according to some embodiments of the present invention. Method 500 can be performed by a server in communication with mobile device (e.g., activation server, FMD server, or the like). At block 510, a remote server computer can receive a device identifier from a mobile device during an activation or set up process.

At block 520, the server computer can determine whether the device identifier is associated with a cloud-based user account (e.g., an FMD account). For example, the server computer can initiate query on an account database and/or an activation record database. In some embodiments, block 520 can include determining whether a mobile device associated with the hardware ID has been activated before or whether the device is being activated for the first time. In some embodiments, when a device is reset (e.g., restored to factory settings), the reset device may be required to go through the activation (reactivation) process again. In the reactivation process, a remote server can receive the device information and determine that the device was previously activated and that FMD mode was enabled for the device.

If the server determines that the device identifier is associated with an account, at block 525, the server can transmit a challenge to the device. In some embodiments, the challenge is for account credentials, such as an account identifier and/or an account password. The server can then receive a challenge response at block 530. For example, a user of the mobile device may enter a challenge response on the mobile device and the mobile device can transmit it to the server.

At block 535, the server can determine whether the challenge response is valid. In some embodiments, if the challenge response is valid (e.g., the response matches authentication credentials stored on the server), then the mobile device can be reactivated (block 540). In some embodiments, if an invalid challenge response is received, the mobile device activation can be denied (block 545). In some embodiments, if the challenge response is invalid, the mobile device user may be challenged again. In some embodiments, there is a threshold maximum number of times that an incorrect challenge response can be provided before reactivation is denied and/or the device functionality is limited. After a threshold maximum of invalid challenge responses, the server may deny reactivation (545).

If the server determines that the device identifier is not associated with an account, at block 550, the device can be activated. That is, since the hardware ID was not previously associated with an FMD account, the device can be activated as normal. This could be, for example, because the device is being activated for the first time or because the device was not previously associated with an FMD account. In some embodiments, the step of activation may occur in a different order than shown in FIG. 5. For example, activation can occur after storing linked information (570) or at another suitable time.

At block 555, the server can receive an account identifier from the mobile device. The account identifier can be any user cloud-based user account. In some embodiments, the account is an account that provides an FMD service. For example, the account can be an FMD account, and the identifier can be an FMD account user name. Other cloud-based account are suitable. In some embodiments, the account is a general account that provides various cloud computing services and the like.

At block 560, an account password or other authentication data can be received at the server. Authentication data can include a PIN, password, biometric identification data, or similar authentication. Multi-factor authentication can be used (e.g., two or three factor authentication).

At block 565, the server computer can link the device hardware identifier with the account identifier and/or account password. Linking the device hardware identifier with the account identifier and/or account password on a server before a device is lost, stolen, or misplaced can be beneficial because it provides an external technique for authenticating the device. That is, user authentication can still occur, using the hardware identifier, even if the device has been erased/reset. Furthermore, user authentication can still occur even if a local passcode lock is not used or is circumvented. For example, if a hardware identifier is not associated with an account identifier and/or account password before the device falls into the hands of an unauthorized third party, the unauthorized user may simply turn off FMD mode or erase/reset the device. In this case, there may be limited recourse to prevent the unauthorized user from disabling the FMD mode or resetting/erasing the device. This can make the device hard to locate and recover.

At block 570, the linked information can be stored to a database in communication with the server for later use in authenticating a user attempting to disable an FMD mode on a device. For example, the server can link the hardware identifier, the cloud-based account, and/or the authentication data and store it in a database.

Figure 6:
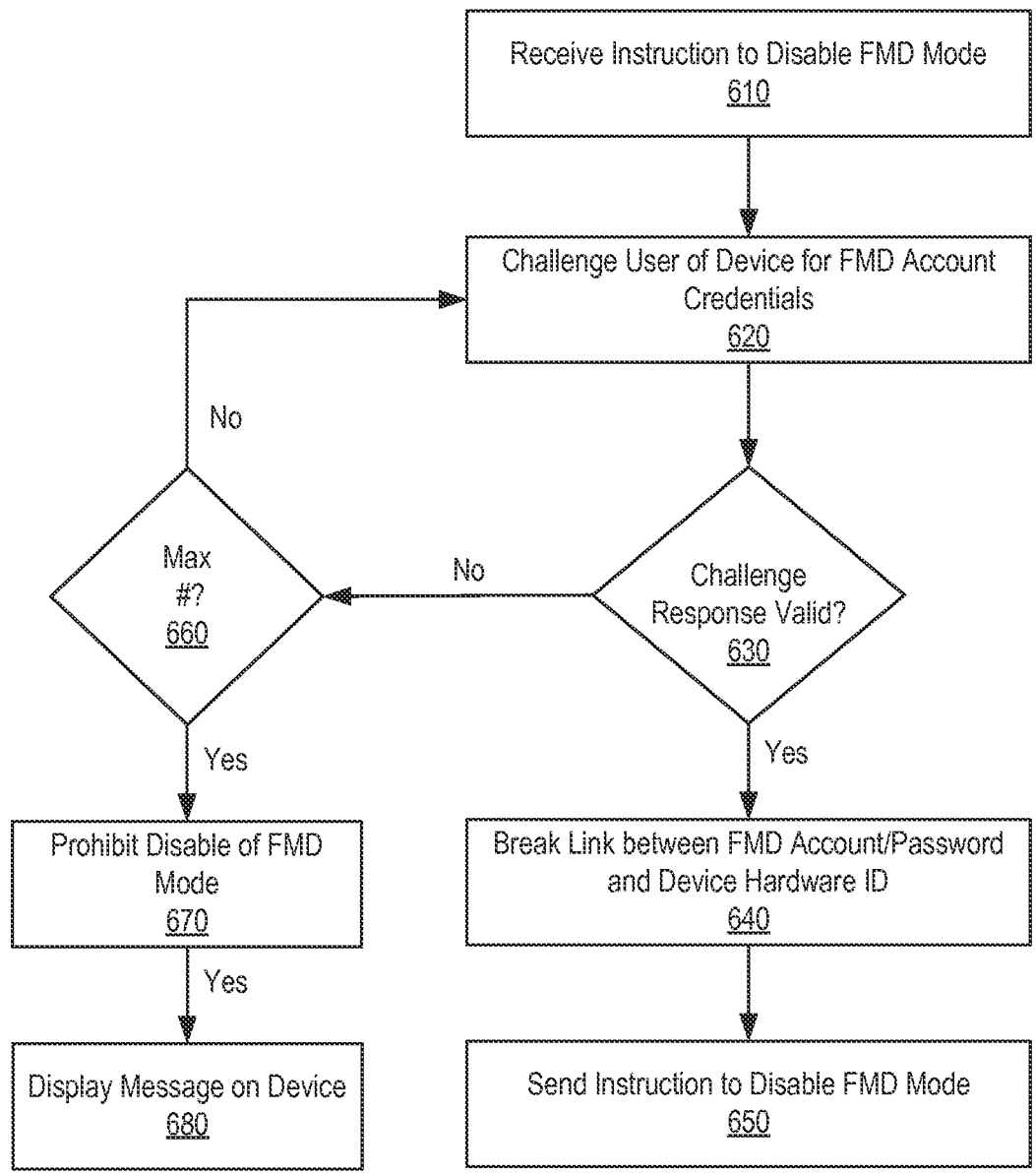
FIG. 6 illustrates a high-level process flow of a method of disabling an FMD mode on a mobile device according to some embodiments of the present invention.

FIG. 6 illustrates a high-level process flow of a method 600 of disabling an FMD mode on a mobile device according to some embodiments of the present invention. Method 600 can be performed by a mobile device and/or a server in communication with the mobile device.

At block 610, an instruction is received to disable an FMD mode. In some embodiments, the instruction may be received as a user input from a user operating the mobile device (e.g., toggling an option in a device settings menu, such as Settings>Location Services>Find My Device ON/OFF) or other computing device in communication with the mobile device (e.g., iTunes sync). Content and settings may be reset or erased, for example, using a settings menu user interface (e.g., Settings>General>Reset All Data, Erase all settings, Erase All Content, or the like). In some embodiments, the instruction may be the resetting, restoring, or erasing of a mobile device. For example, restoring a mobile device to factory settings can be considered an instruction to disable the FMD mode.

In some embodiments, mobile device erase or reset can be disabled until an FMD mode of the device is disabled. That is, the user can be prevented from erasing/resetting a device while the FMD mode is enabled on the device. For example, the "Reset All Settings" and/or "Erase All Content and Settings" options in FIG. 11 may be disabled. In this circumstance, the user may be presented with a prompt that indicates that FMD mode must be turned off before the user is allowed to reset or erase the device. In some embodiments, the user interface may present a shortcut to the appropriate settings menu such that the user can easily disable an FMD mode after being properly authenticated.

At block 620, a user of the mobile device is challenged for account credentials that are associated with the hardware identifier of the mobile device. The challenge can be generated by a server computer and transmitted to the mobile device. In some embodiments, the mobile device displays the challenge and accepts a user input challenge response. In some embodiments, a separate computing device in communication with the mobile device displays the challenge and accepts a user input challenge response.

At block 630, the server computer determines whether the account credentials are valid. For example, the server computer can query a database or another server computer to determine whether the user-provided challenge response is valid (e.g., whether the challenge response matches the account credentials in the database).

At block 640, if the challenge response was valid, the server can break the link between the hardware identifier and the user account. This step is optional, as some embodiments may maintain the association between the hardware identifier and the user account. In some circumstances an owner of a mobile device may desire to sell or otherwise transfer possession or ownership of the mobile device. In this scenario, it is desirable to break the link between the unique hardware identifier of the mobile device and the user account. That is, the new owner of the device presumably will not know the account credentials of the previous owner and may want to associate new account credentials with the mobile device.

To accomplish this, in some embodiments, the old user deletes personal data before sale. Responsive to the user input to erase personal data, the mobile device may prompt for a user account identifier and/or a user account password. This challenge can be received from a remote server computer in communication with the mobile device via an Internet connection. If a valid response is provided and the user is authenticated, personal content and settings can be erased locally on the mobile device and the link in between the user account can be broken.

In some embodiments, the old user of the mobile device may not delete personal data before sale. For example, the old user/seller may forget to delete data and/or break the link between the user account and the hardware identifier. In this circumstance, the new user may be prevented from activating the device or disabling FMD mode on the device if the link between the old user account and the mobile device identifier (e.g., the new user does not know the challenge response). In this circumstance, various methods can be used to differentiate between an unauthorized person (e.g., a thief) and an authorized user/owner. In some embodiments, the old user can log into an app (e.g., a find my device app) or web interface (e.g., a find my device web interface) and provide account credentials to break the link between the hardware identifier and the user account. In one embodiment, the old user can otherwise be authenticated in order to break the association between the hardware identifier and the user account (e.g., by calling a customer support telephone number associated with the find my device service and providing proof of identity).

At block 650, an instruction to disable the FMD mode is generated. In some embodiments, this instruction can be generated by a server computer and is received by the mobile device. The mobile device may disable the FMD mode on the device in response to receiving/generating the instruction. In some embodiments, the server computer can transmit a message to the mobile device indicating that valid credentials were provided, and responsive to this message, the mobile device can generate an instruction to disable the FMD mode.

At block 660, if the challenge response is not valid, the server computer can determine whether a threshold maximum number of authentication attempts have been made unsuccessfully. If less than a threshold maximum unsuccessful attempts have been made, the process flow can return to block 620. If the threshold maximum unsuccessful attempts have been made, the device may be prohibited from disabling the FMD mode on the device (block 670). In some embodiments, a message indicating that a threshold maximum has been reached can be displayed (block 680). In some embodiments, the message can indicate that FMD cannot be disabled for a threshold period of time or until a predetermined event occurs.

III. Sample User Interfaces

Figure 7:
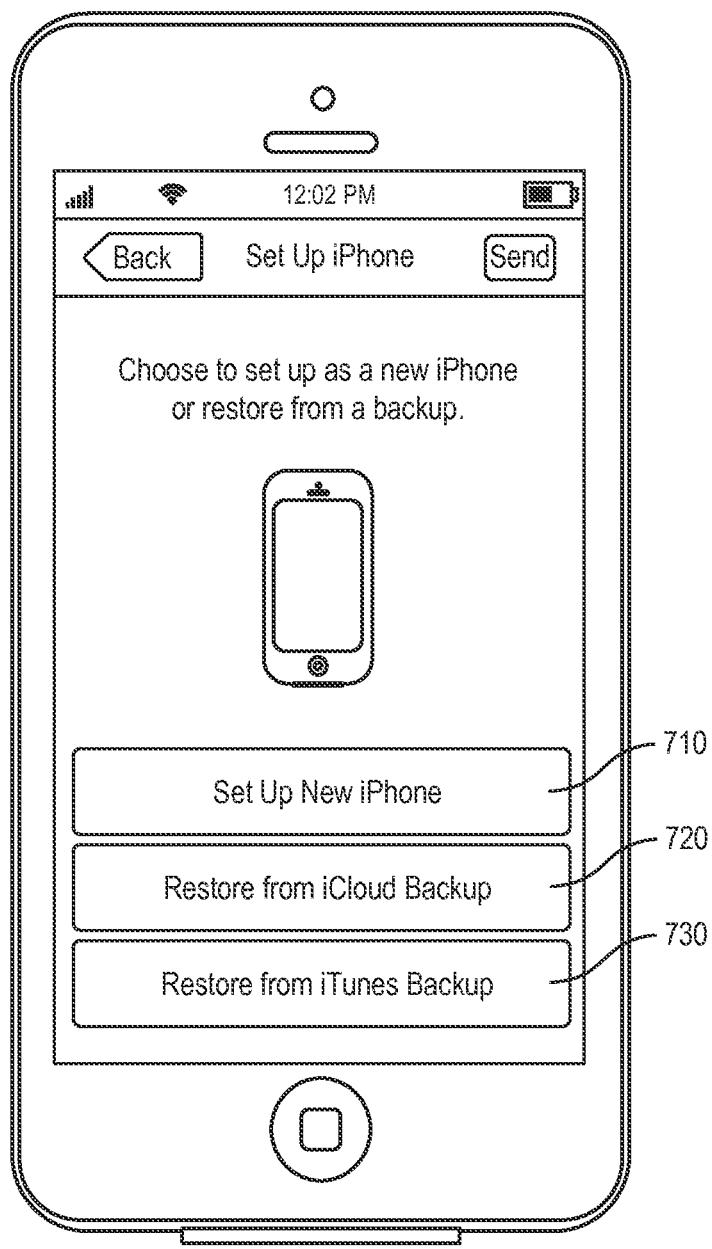
FIG. 7 illustrates a user interface of an embodiment of setting up and activating a mobile device according to some embodiments of the present invention.

FIG. 7 illustrates a user interface of an exemplary embodiment of setting up and activating a mobile device. As illustrated, the mobile device can be set up as a new device 710, restored from a cloud backup 720, or restored from a locally stored backup 730. This is an example of a user interface that could be used as part of an activation or setup process.

Figure 8:
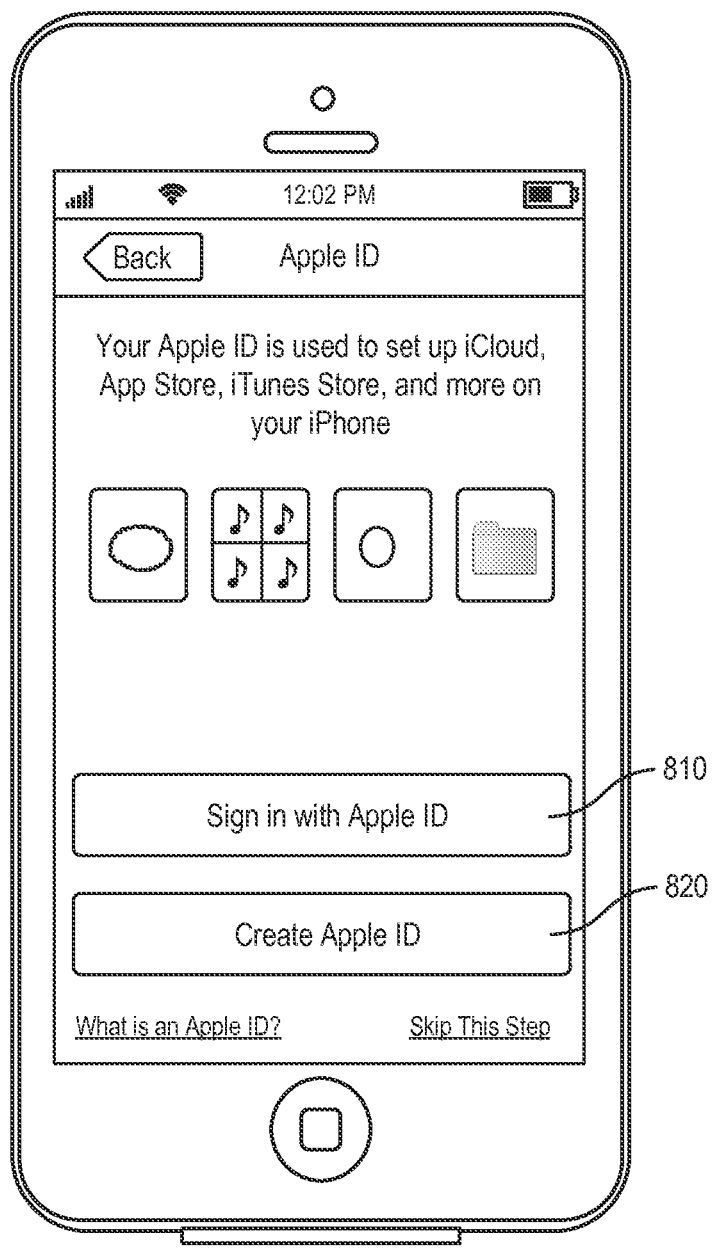
FIG. 8 illustrates a user interface of an embodiment of providing account credentials according to some embodiments of the present invention.
Figure 10:
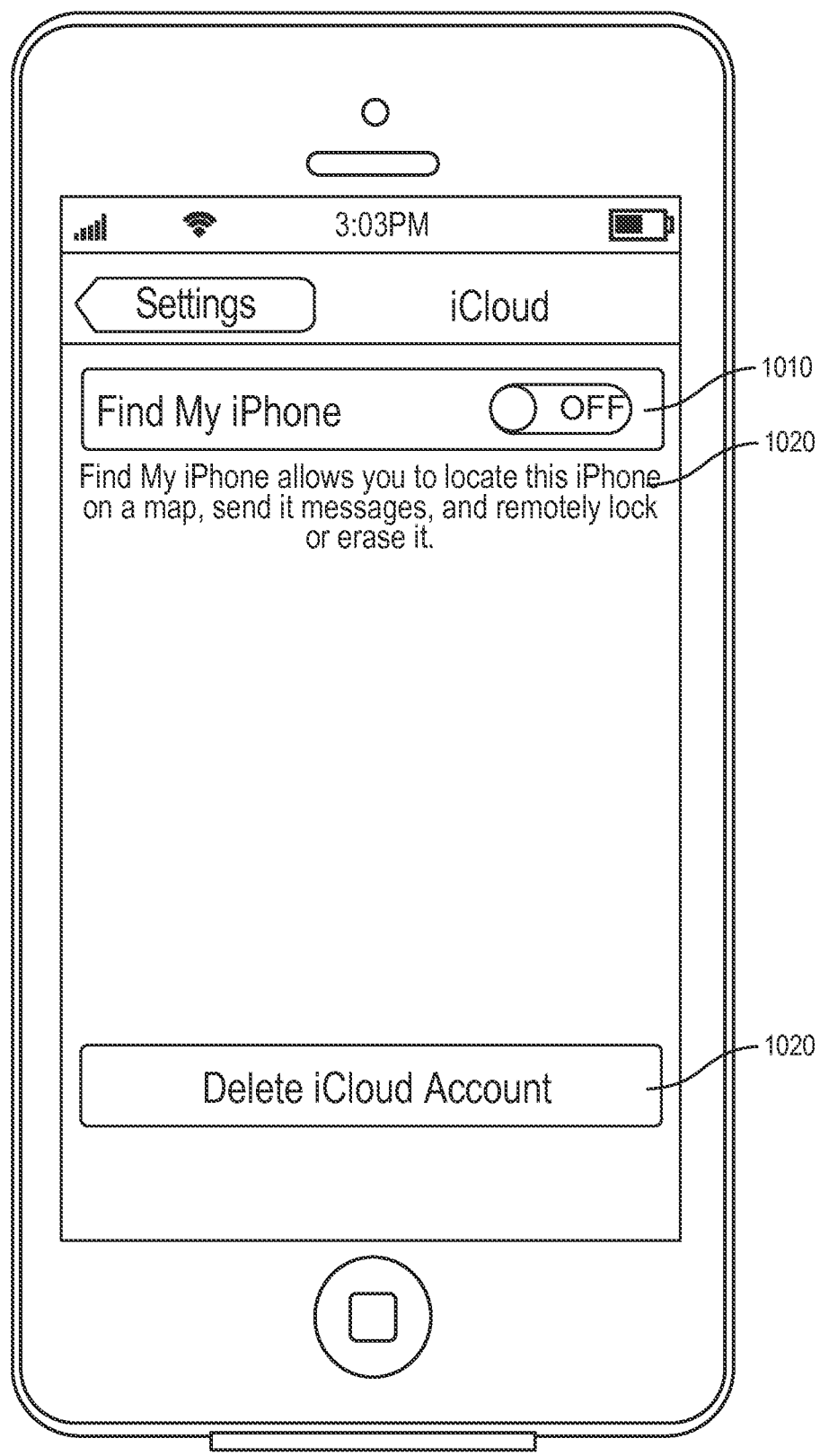
FIG. 10 illustrates an embodiment of a user interface that can be used to disable an FMD mode on a mobile device according to some embodiments of the present invention.

FIG. 8 illustrates a user interface of an exemplary embodiment of providing account credentials. As illustrated, a user interface may be presented such that a user can enter a user account identifier 810 and a user account password 820. This is an example of a user interface that could be used as part of an activation or setup process. In some embodiments, after a user enters user input into fields 810 and 820, an account profile can be created on the mobile device to provide account services on the mobile device. In some embodiments, this account profile can be later disabled or deactivated, for example as illustrated in FIG. 10. In some embodiments, the user account credentials could be provided after the activation and set up process is completed.

Figure 9:
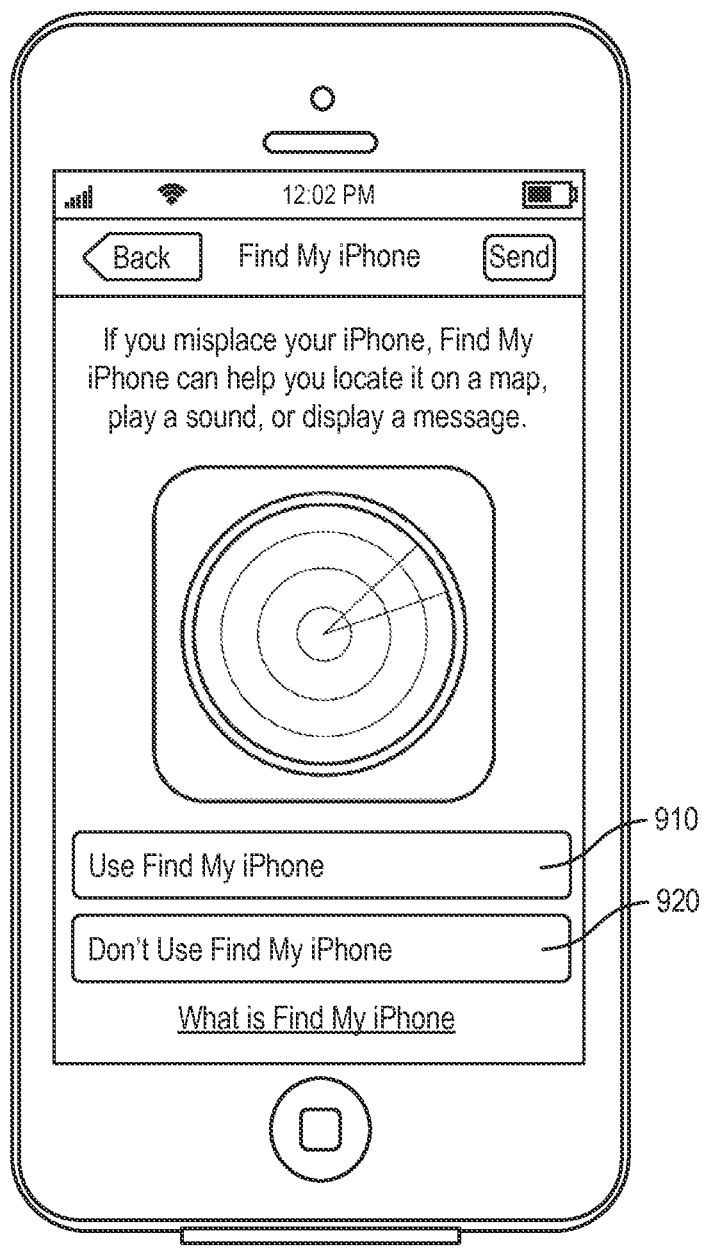
FIG. 9 illustrates a user interface of an embodiment of enabling an FMD mode on a mobile device according to some embodiments of the present invention.

FIG. 9 illustrates a user interface of an exemplary embodiment of enabling an FMD mode on a mobile device. As illustrated, a user interface may be presented such that a user can choose enable an FMD mode (910) or not enable the FMD mode (920). This is an example of a user interface that could be used as part of an activation or setup process. In some embodiments, the enabling of the FMD mode can be done after the activation and set up process is completed. In some embodiments, responsive to the enabling of the FMD mode, a server computer associates a hardware identifier with user account credentials, as has been described herein.

FIG. 10 illustrates a user interface of an exemplary embodiment of a user interface that can be used to disable an FMD mode on a mobile device. In one example, an FMD mode can be disabled by toggling a button 1010 from ON to OFF, or the like. In another example, an FMD mode can be disabled by deleting or deactivating the user account from the mobile device by selecting a button 1020 that deletes or deactivates the user account. In some embodiments, responsive to toggling button 1010 or actuating button 1020, an instruction to disable the FMD mode can be generated and transmitted to a server.

Figure 11:
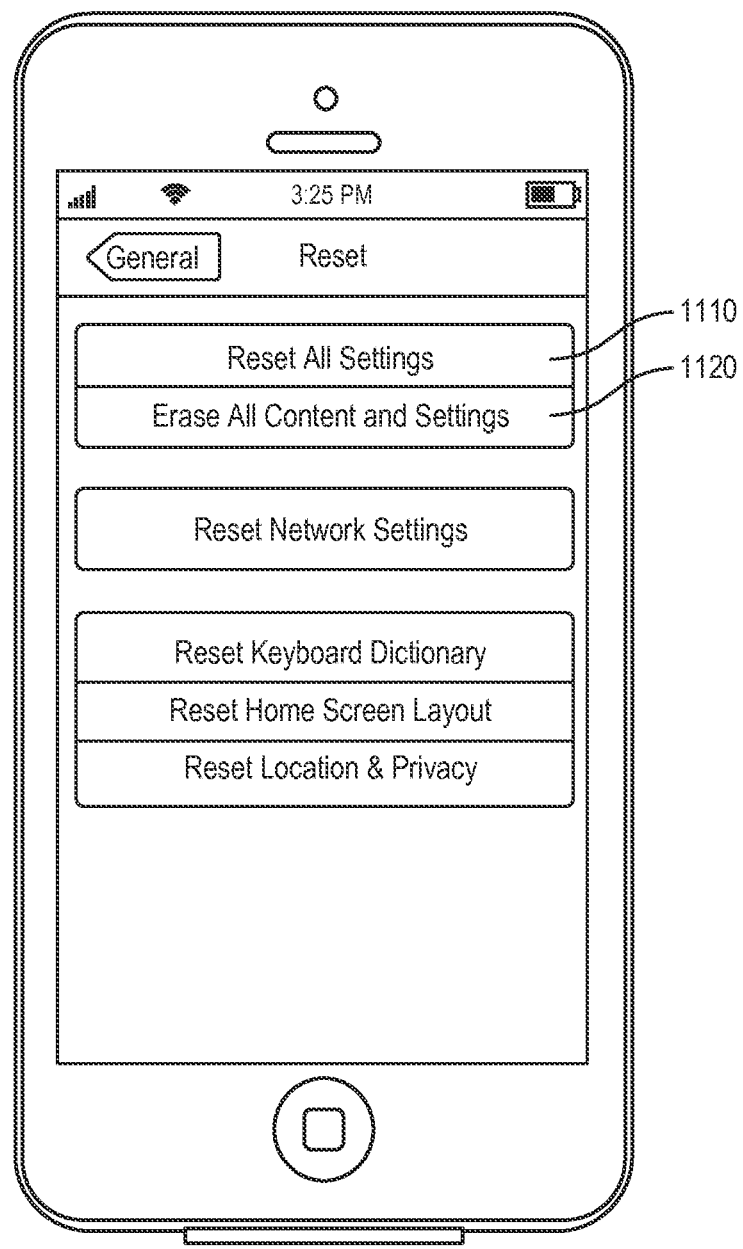
FIG. 11 illustrates an embodiment of a user interface that can be used to disable an FMD mode on a mobile device according to some embodiments of the present invention.

FIG. 11 illustrates a user interface of an exemplary embodiment of a user interface that can be used to disable an FMD mode on a mobile device. In one example, an FMD mode can be disabled by actuating button 1110 to reset all settings. In another example, an FMD mode can be disabled by actuating a button 1120 to erase all content and settings. In some embodiments, responsive to actuating button 1110 or button 1120, an instruction to disable the FMD mode can be generated and transmitted to a server.

One having skill in the art will recognize that there are many other possibilities for user interfaces to activate a mobile device, enable an FDM mode, and disable an FMD mode on a mobile device. The examples shown are merely exemplary and not limiting.

FIG. 12 illustrates a user interface of an exemplary embodiment of location data being presented on a request user device. As illustrated, the location data 1205 can be presented as a dot over a map to illustrate the location of the lost, stolen, or misplaced device. Further, an info box 1210 can be presented with the dot that displays the time the location data was collected. As illustrated, the lost device was determined to be at the identified location one minute prior to the location data being presented.

FIG. 13 illustrates a user interface of an exemplary embodiment of location data being presented on a requesting user device. As illustrated multiple location data points 1305, 1310, 1315 and 1320 can be displayed as dots on a map to illustrate the movement of the lost device. The location data points can be connected by a line to display the path of the lost device and the dots can be different colors to signify which location data point is the most recent. For example, all previous location data points can be illustrated in one color, such as green, while the most current data location point can be illustrated in a different color, such as red. Further, each location data point can be configured to display an information box 1325 associated with the location data point that identifies the time at which the device was at the given location data point. As illustrated, the mobile device was at location data point 1315 at approximately 15 minutes prior at 11:30 am.

IV. Sample Computer System

Figure 14:
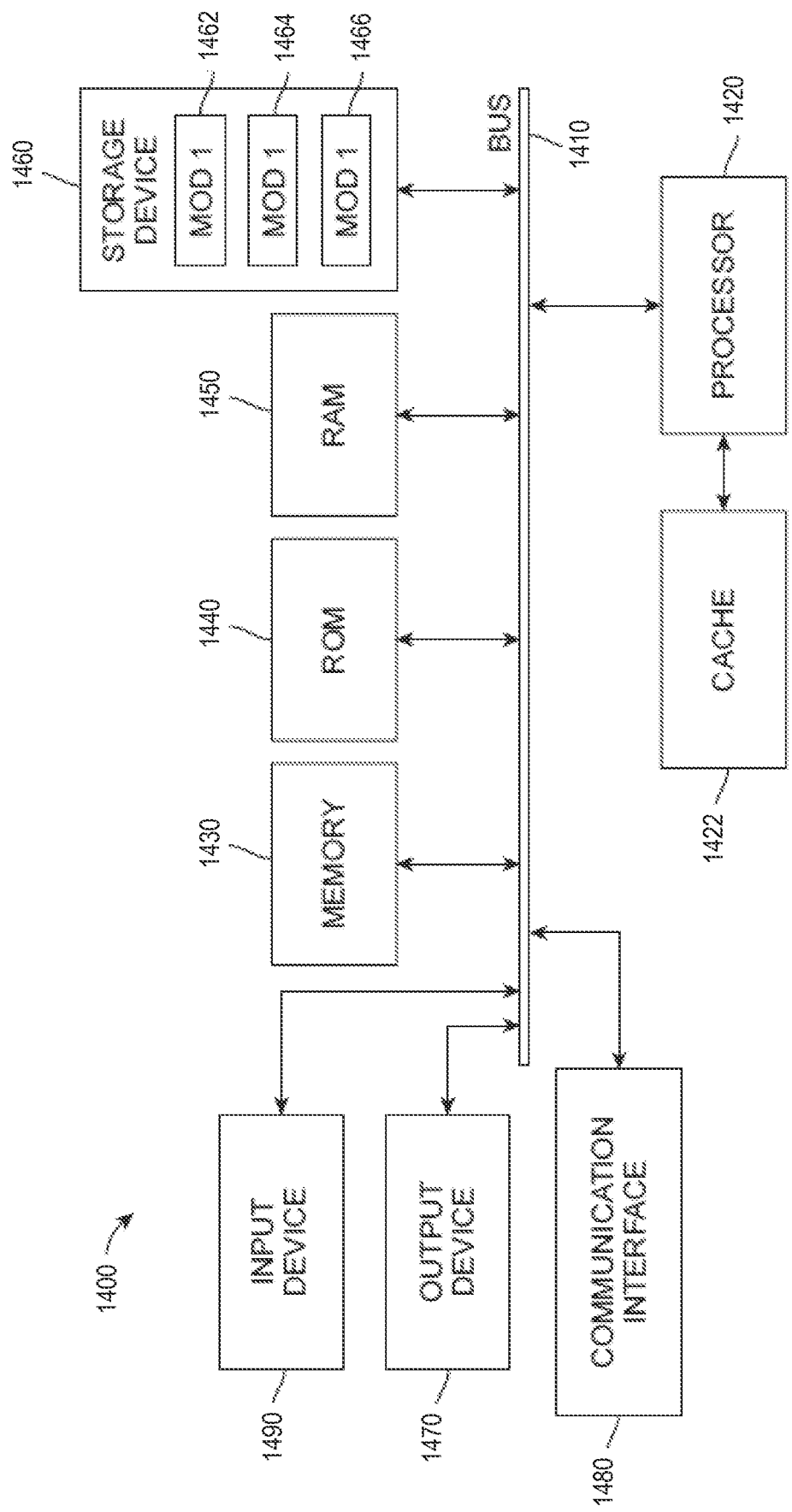
FIG. 14 illustrates a computer system that can be used in accordance with embodiments of the present invention.

With reference to FIG. 14, an exemplary system 1400 includes a general-purpose computing device 1400, including a processing unit (CPU or processor) 1420 and a system bus 1410 that couples various system components including the system memory 1430 such as read only memory (ROM) 1440 and random access memory (RAM) 1450 to the processor 1420. The system 1400 can include a cache 1422 of high speed memory connected directly with, in close proximity to, or integrated as part of the processor 1420. The system 1400 copies data from the memory 1430 and/or the storage device 1460 to the cache 1422 for quick access by the processor 1420. In this way, the cache 1422 provides a performance boost that avoids processor 1420 delays while waiting for data. These and other modules can control or be configured to control the processor 1420 to perform various actions. Other system memory 1430 may be available for use as well. The memory 1430 can include multiple different types of memory with different performance characteristics. It can be appreciated that the disclosure may operate on a computing device 1400 with more than one processor 1420 or on a group or cluster of computing devices networked together to provide greater processing capability. The processor 1420 can include any general purpose processor and a hardware module or software module, such as module 1 1462, module 2 1464, and module 3 1466 stored in storage device 1460, configured to control the processor 1420 as well as a special-purpose processor where software instructions are incorporated into the actual processor design. The processor 1420 may essentially be a completely self-contained computing system, containing multiple cores or processors, a bus, memory controller, cache, etc. A multi-core processor may be symmetric or asymmetric.

The system bus 1410 may be any of several types of bus structures including a memory bus or memory controller, a peripheral bus, and a local bus using any of a variety of bus architectures. A basic input/output (BIOS) stored in ROM 1440 or the like, may provide the basic routine that helps to transfer information between elements within the computing device 1400, such as during start-up. The computing device 1400 further includes storage devices 1460 such as a hard disk drive, a magnetic disk drive, an optical disk drive, tape drive or the like. The storage device 1460 can include software modules 1462, 1464, and 1466 for controlling the processor 1420. Other hardware or software modules are contemplated. The storage device 1460 is connected to the system bus 1410 by a drive interface. The drives and the associated computer-readable storage media provide non-volatile storage of computer-readable instructions, data structures, program modules and other data for the computing device 1400. In one aspect, a hardware module that performs a particular function includes the software component stored in a non-transitory computer-readable medium in connection with the necessary hardware components, such as the processor 1420, bus 1410, output device 1470, and so forth, to carry out the function. The basic components are known to those of skill in the art and appropriate variations are contemplated depending on the type of device, such as whether the device 1400 is a small, handheld computing device, a desktop computer, or a computer server.

Although the exemplary embodiment described herein employs a storage device 1460, it should be appreciated by those skilled in the art that other types of computer-readable media which can store data that are accessible by a computer, such as magnetic cassettes, flash memory cards, digital versatile disks, cartridges, random access memories (RAMs) 1450, read-only memory (ROM) 1440, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 1400, an input device 1490 represents any number of input mechanisms, such as a microphone for speech, a touch-sensitive screen for gesture or graphical input, keyboard, mouse, motion input, speech and so forth. An output device 1470 can also be one or more of a number of output mechanisms known to those of skill in the art. In some instances, multimodal systems enable a user to provide multiple types of input to communicate with the computing device 1400. The communications interface 1480 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 1420. The functions these blocks represent may be provided through the use of either shared or dedicated hardware, including, but not limited to, hardware capable of executing software and hardware, such as a processor 1420, that is purpose-built to operate as an equivalent to software executing on a general purpose processor. For example the functions of one or more processors presented in FIG. 14 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 1440 for storing software performing the operations discussed below, and random access memory (RAM) 1450 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 1400 shown in FIG. 14 can practice all or part of the recited methods, can be a part of the recited systems, and/or can operate according to instructions in the recited non-transitory computer-readable storage media. Such logical operations can be implemented as modules configured to control the processor 1420 to perform particular functions according to the programming of the module. For example, FIG. 14 illustrates three modules Mod1 1462, Mod2 1464 and Mod3 1466, which are modules configured to control the processor 1420. These modules may be stored on the storage device 1460 and loaded into RAM 1450 or memory 1430 at runtime or may be stored.

The present disclosure recognizes that the use of such personal information data in the present technology can be used to the benefit of users. For example, the personal information data can be used to better understand user behavior, facilitate and measure the effectiveness of advertisements, applications, and delivered content. Accordingly, use of such personal information data enables calculated control of the delivered content. For example, the system can reduce the number of times a user receives a given ad or other content and can thereby select and deliver content that is more meaningful to users. Such changes in system behavior improve the user experience. Further, other uses for personal information data that benefit the user are also contemplated by the present disclosure.

The present disclosure further contemplates that the entities responsible for the collection, analysis, disclosure, transfer, storage, or other use of such personal information data should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after the informed consent of the users. Additionally, such entities would take any needed steps for safeguarding and securing access to such personal information data and ensuring that others with access to the personal information data adhere to their privacy and security policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for advertisement delivery services. In yet another example, users can configure their devices or user terminals to prevent storage or use of cookies and other mechanisms from which personal information data can be discerned. The present disclosure also contemplates that other methods or technologies may exist for blocking access to their personal information data.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that performs particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

It is understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method comprising:
receiving, at a mobile device, a user input to enable a security setting, the security setting requires reactivation of the mobile device with user account credentials following receipt of a second user input at the mobile device to restore the mobile device to factory settings, wherein a hardware identifier of the mobile device is associated with a user account;
on the mobile device, the mobile device having been restored to factory settings:
entering, by the mobile device, an activation operating mode, wherein the mobile device is configured to enable one or more functions in the activation operating mode;
determining, during the activation operating mode, that the mobile device is associated with the user account;
presenting, on the mobile device, a user interface including a challenge for user account credentials for the user account; and
activating the mobile device in response to receipt of valid user account credentials at the user interface.

2. The method as in claim 1, further comprising:
blocking activation of the mobile device until receipt of valid user account credentials at the user interface.

3. The method of claim 1, further comprising:
limiting functionality of the mobile device until the mobile device is activated.

4. The method of claim 1, further comprising:
disabling the security setting upon request of a deletion of the user account from the mobile device.

5. The method of claim 1, further comprising:
activating the mobile device with an association of the user account with the mobile device.

6. The method of claim 1, further comprising:
enabling the security setting with an association of the user account with the mobile device.

7. The method of claim 1, further comprising:
transmitting a request to a server to determine if the security setting is enabled for the mobile device, the request being associated with a hardware identifier of the mobile device; and
receiving request for the challenge for the user account credentials of the user account when the security setting is enabled for the mobile device.

8. A method comprising:
receiving, at a mobile device, a user input to enable a security setting, the security setting requires user account credentials following receipt of a second user input at the mobile device with a request to restore the mobile device to factory settings, wherein a hardware identifier of the mobile device is associated with a user account;
on the mobile device, the mobile device having received the second user input:
determining that the mobile device is associated with the user account;
presenting, on the mobile device, a user interface including a challenge for the user account credentials of the user account; and
restoring the mobile device to factory settings in response to receipt of valid user account credentials at the user interface.

9. The method as in claim 8, further comprising:
blocking one or more functions of the mobile device until receipt of valid user account credentials at the user interface.

10. The method as in claim 8, further comprising:
limiting functionality of the mobile device until the mobile device is activated.

11. The method as in claim 8, further comprising:
disabling the security setting upon request of a deletion of the user account from the mobile device.

12. The method as in claim 8, further comprising:
activating the mobile device with an association of the user account with the mobile device.

13. The method as in claim 8, further comprising:
enabling the security setting with the association of the user account with the mobile device.

14. A data processing system on a mobile device, wherein the data processing system comprises:
one or more processors; and
a non-transitory computer-readable medium comprising code that, when executed by the processor, cause the one or more processors to perform operations comprising:
receiving, at the mobile device, a user input to enable a security setting, the security setting requires reactivation of the mobile device with user account credentials following receipt of a second user input at the mobile device to restore the mobile device to factory settings, wherein a hardware identifier of the mobile device is associated with a user account;
on the mobile device, the mobile device having been restored to factory settings:
entering, by the mobile device, an activation operating mode, wherein the mobile device is configured to enable one or more functions in the activation operating mode;
determining, during the activation operating mode, that the mobile device is associated with the user account;
presenting, on the mobile device, a user interface including a challenge for user account credentials for the user account; and
activating the mobile device in response to receipt of valid user account credentials at the user interface.

15. The data processing system as in claim 14, the operations further comprising:
blocking activation of the mobile device until receipt of valid user account credentials at the user interface.

16. The data processing system as in claim 14, the operations further comprising:
limiting functionality of the mobile device until the mobile device is activated.

17. The data processing system as in claim 14, the operations further comprising:
disabling the security setting upon request of a deletion of the user account from the mobile device.

18. The data processing system as in claim 14, the operations further comprising:
activating the mobile device with an association of the user account with the mobile device.

* * * * *